United States Patent [19]
Onishi et al.

[11] Patent Number: 5,335,251
[45] Date of Patent: Aug. 2, 1994

[54] DIVERSITY RECEIVER

[75] Inventors: Hiroshi Onishi, Machida; Akihiko Matsuoka, Itabashi; Kouei Misaizu, Kawasaki; Yuuri Yamamoto, Yokohama, all of Japan

[73] Assignee: Matsushita Electric Industrial Co., Ltd., Japan

[21] Appl. No.: 995,077

[22] Filed: Dec. 22, 1992

[30] Foreign Application Priority Data

Dec. 25, 1991 [JP] Japan .................................. 3-342627

[51] Int. Cl.⁵ .......................... H04B 7/10; H04L 1/02
[52] U.S. Cl. .................................... 375/100; 455/132; 455/137; 375/14
[58] Field of Search ...................... 375/100, 40, 11, 14, 375/15, 102; 364/724.2; 455/132, 133, 137, 138

[56] References Cited

U.S. PATENT DOCUMENTS

| | | |
|---|---|---|
| 4,281,411 | 7/1981 | Bonn et al. |
| 4,328,585 | 5/1982 | Monsen. |
| 5,065,411 | 11/1991 | Muto. |
| 5,200,977 | 4/1993 | Ohnishi et al. ............... 375/100 X |
| 5,203,027 | 4/1993 | Nounin et al. ............... 375/100 X |

OTHER PUBLICATIONS

Ariyauisitakul, "A Decision Feedback Equalizer with Time-Reversal Structure," IEEE Journal on Selected Areas in Communications, vol. 10, No. 3, Apr. 1992 pp. 599–613.

Balaban, Philip, "Dual Diversity Combining & Equalization in Digital Cellular Mobile Radio," IEEE Trans. on Vech. Tech. vol. 40, No. 2, May 1991 pp. 342-354.

*Primary Examiner*—Stephen Chin
*Assistant Examiner*—Bryan Webster
*Attorney, Agent, or Firm*—Parkhurst, Wendel & Rossi

[57] ABSTRACT

A diversity receiver includes a first antenna and a second antenna. A first receiving section connected to the first antenna serves to convert a digital modulation wave induced at the first antenna into a first intermediate-frequency signal. A first band pass filter connected to the first receiving section serves to subject the first intermediate-frequency signal to a band pass filtering process. A second receiving section connected to the second antenna serves to convert a digital modulation wave induced at the second antenna into a second intermediate-frequency signal. A second band pass filter connected to the second receiving section serves to subject the second intermediate-frequency signal to a band pass filtering process. A switch alternately selects one of output signals of the first and second band pass filters at a period equal to a half of a period corresponding to the symbol rate. A quadrature demodulator connected to the switch serves to demodulate an output signal of the switch into quadrature baseband signals. An analog-to-digital converter connected to the quadrature demodulator converts the quadrature baseband signals into corresponding digital signals. A decision feedback adaptive equalizer connected to the analog-to-digital converter serves to subject the digital signals to an equalizing process.

4 Claims, 5 Drawing Sheets

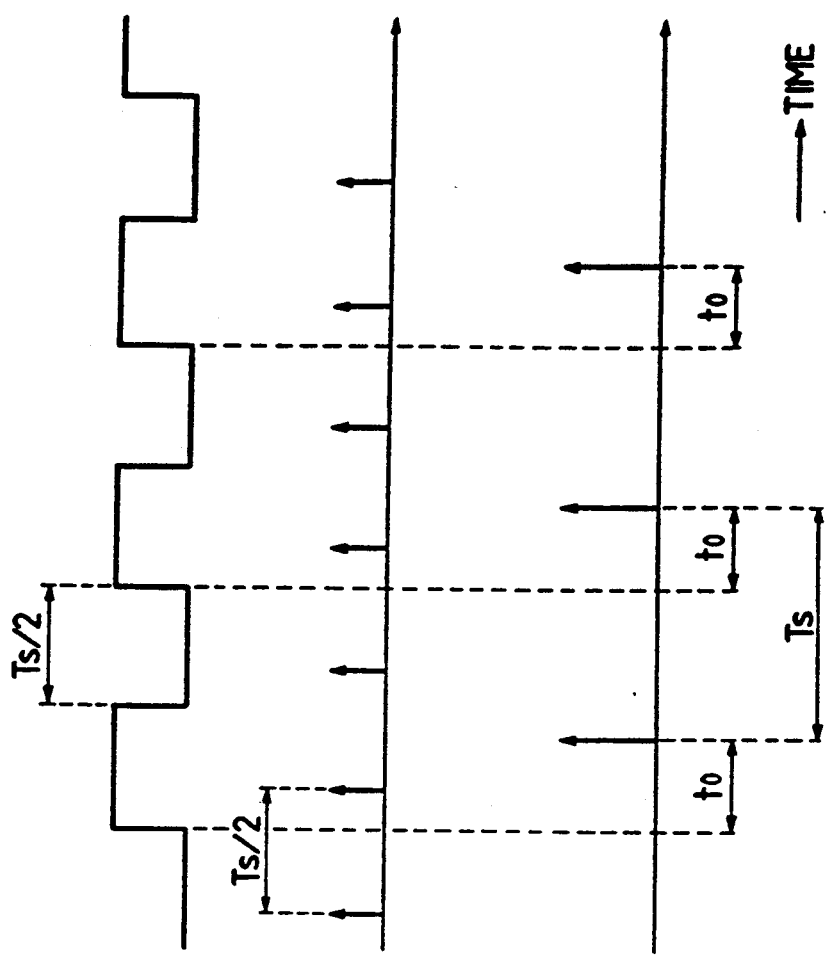
FIG. 5(a) SWITCH CONTROL SIGNAL
FIG. 5(b) SIGNAL SAMPLING
FIG. 5(c) TAP COEFFICIENT UPDATING

DIVERSITY RECEIVER

BACKGROUND OF THE INVENTION

1. Field of the Invention

This invention relates to a diversity receiver for radio communication using digital modulation.

2. Description of the Prior Art

In radio communication between a mobile station and a base station or between mobile stations, a received signal in a reception side tends to undergo fading effects. A diversity reception system is a well-known art for minimizing fading effects by combining at least two received signals or selecting one of at least two received signals.

Generally, in transmission of a radio signal between a mobile station and a base station or between mobile stations, a part of the radio signal directly propagates from a transmitter to a receiver while a remaining part thereof tends to be reflected and scattered by various bodies such as buildings or mountains and then reach the receiver with a delay. Thus, the radio signal propagates from the transmitter to the receiver via multipaths. Accordingly, the signal received by the receiver has a direct signal component and a delay signal component, suffering from a distortion called a multipath distortion. In addition, the received signal tends to undergo frequency selective fading effects caused by multipath propagation.

Generally, it is difficult for a simple or primitive diversity reception system to adequately suppress such frequency selective fading effects.

Some of prior art advanced receivers are designed so as to suppress frequency selective fading effects. As will be described later, such a prior art advanced receiver has some problem.

SUMMARY OF THE INVENTION

It is an object of this invention to provide an improved diversity receiver.

This invention provides a diversity receiver for a digital modulation wave having a given symbol rate which comprises a first antenna; a first receiving section connected to the first antenna for converting a digital modulation wave induced at the first antenna into a first intermediate-frequency signal; a first band pass filter connected to the first receiving section for subjecting the first intermediate-frequency signal to a band pass filtering process; a second antenna; a second receiving section connected to the second antenna for converting a digital modulation wave induced at the second antenna into a second intermediate-frequency signal; a second band pass filter connected to the second receiving section for subjecting the second intermediate-frequency signal to a band pass filtering process; switch means for alternately selecting one of output signals of the first and second band pass filters at a period equal to a half of a period corresponding to the symbol rate; a quadrature demodulator connected to the switch means for demodulating an output signal of the switch means into quadrature baseband signals; an analog-to-digital converter connected to the quadrature demodulator for converting the quadrature baseband signals into corresponding digital signals; and a decision feedback adaptive equalizer connected to the analog-to-digital converter for subjecting the digital signals to an equalizing process.

BRIEF DESCRIPTION OF THE DRAWINGS

FIGS. 5A-5C is a timing diagram of transitions of a switch control signal, signal sampling, and tap coefficient updating in the diversity receiver of FIG. 3.

DESCRIPTION OF THE PREFERRED EMBODIMENT

Prior art receivers will now be described for a better understanding of this invention.

Figure 1:
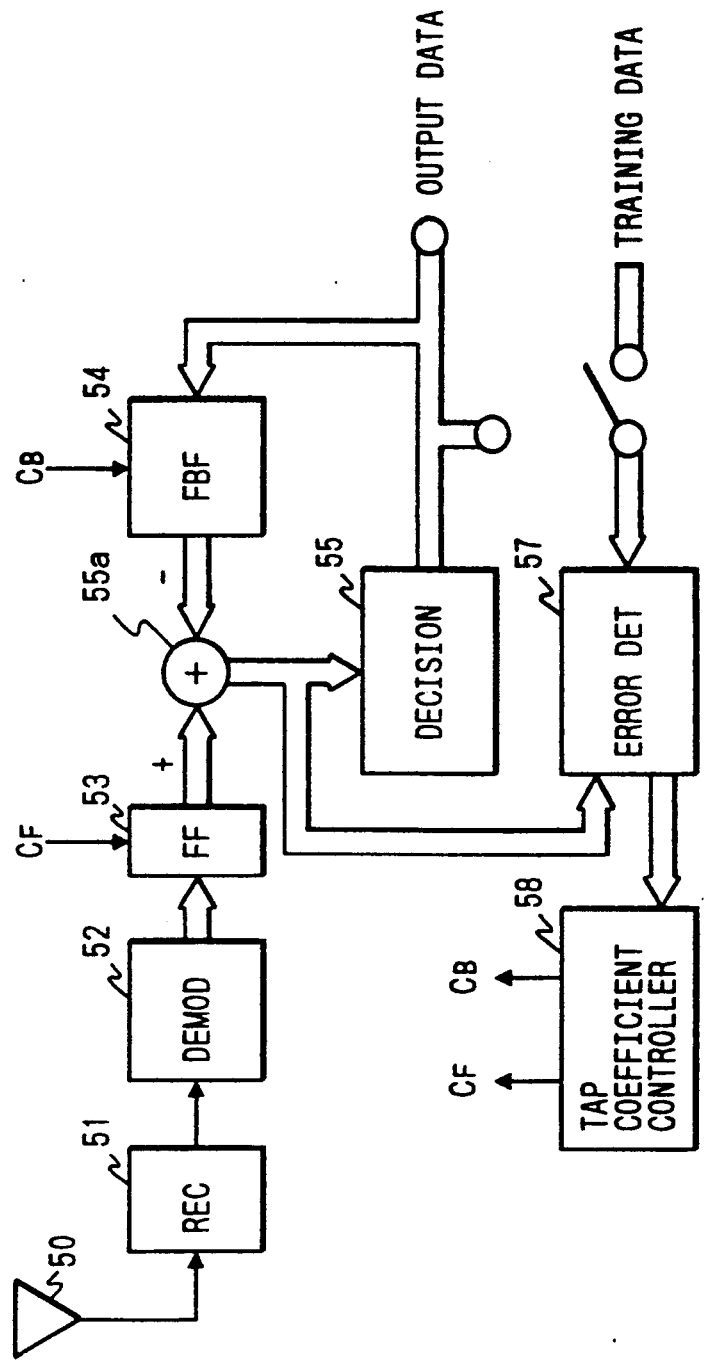
FIG. 1 is a block diagram of a prior art receiver.

FIG. 1 shows a prior art receiver for radio communication using digital modulation. The prior art receiver of FIG. 1 is designed so as to mitigate for multipath fading. With reference to FIG. 1, a radio signal induced in an antenna 50 is fed to a receiving section 51 followed by a quadrature demodulator 52. The received radio signal is converted into separate digital quadrature baseband signals (I and Q signals) by the combination of the receiving section 51 and the quadrature demodulator 52. The quadrature baseband signals are fed to a forward filter (FF) 53 composed of a transversal digital filter.

In the prior art receiver of FIG. 1, a substracter 55a derives the difference between an output signal from the forward filter 53 and an output signal from a feedback filter (FBF) 54 composed of a transversal digital filter. A decision section 55 decides demodulated data from an output signal of the subtracter 55a. The demodulated data is used as a receiver output signal. Also, the demodulated data is fed to the feedback filter 54.

In the prior art receiver of FIG. 1, tap coefficients of the forward filter 53 and the feedback filter 54 can be updated as follows. Training data or reference data can be fed to an error detector 57 via a switch (no reference character). The output signal of the subtracter 55a is fed to the error detector 57. The error detector 57 derives an error between the training data and data represented by the output signal of the subtracter 55a, and informs a tap coefficient controller 58 of the derived error. The controller 58 determines desired tap coefficients CF and CB on the basis of the error information, and controls actual tap coefficients of the transversal digital filters in the forward filter 53 and the feedback filter 54 in accordance with the desired tap coefficients CF and CB respectively.

In the prior art receiver of FIG. 1, the devices 53, 54, 55a, 55, 57, and 58 compose an adaptive equalizer of the decision feedback type. The adaptive equalizer in the prior art receiver of FIG. 1 can improve the quality of a received signal suffering from frequency selective fading effects. The prior art receiver of FIG. 1 has a temporal diversity function but has not a spatial diversity function.

Figure 2:
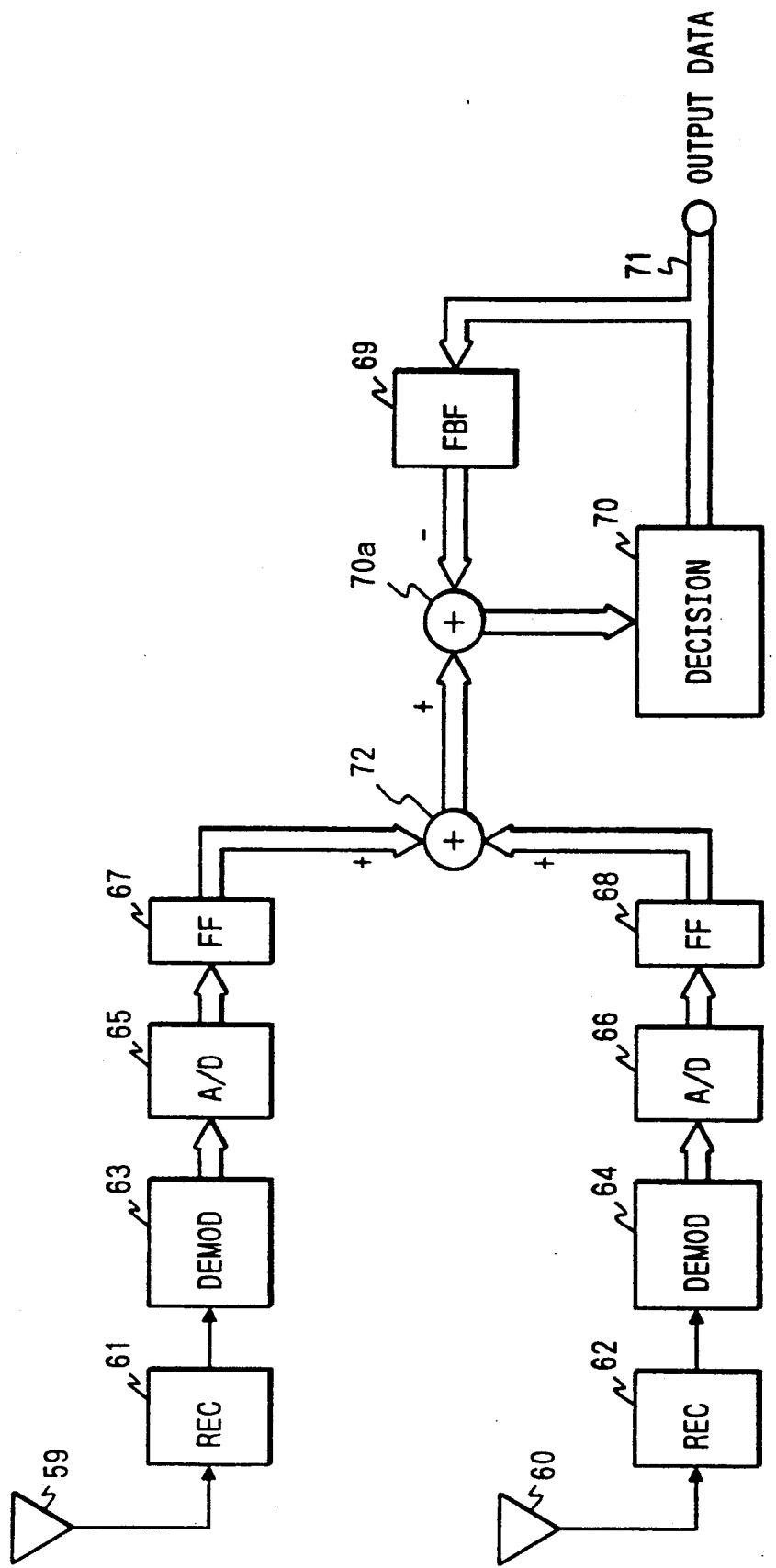
FIG. 2 is a block diagram of a conceivable diversity receiver.

FIG. 2 shows a conceivable diversity receiver which has both a temporal diversity function and a spatial diversity function. The diversity receiver of FIG. 2 is not prior art to this invention. The diversity receiver of FIG. 2 uses a technique disclosed in "Dual Diversity Combining and Equalization in Digital Cellular Mobile Radio" by Philip Balaban et al., IEEE Trans on Vehicular Technology, Vol 40, No. 2, May 1991, pp 342-354.

With reference of FIG. 2, a radio signal induced in an antenna 59 is fed to a receiving section 61 followed by a quadrature demodulator 63. The received radio signal is converted into separate quadrature baseband signals (I and Q signals) by the combination of the receiving section 61 and the quadrature demodulator 63. The quadrature baseband signals are fed from the quadrature demodulator 63 to an analog-to-digital (A/D) converter 65, being converted into corresponding digital quadrature baseband signals by the A/D converter 65. The digital quadrature baseband signals are fed from the A/D converter 65 to a forward filter (FF) 67 composed of a transversal digital filter.

In the diversity receiver of FIG. 2, a radio signal induced in an antenna 60 is fed to a receiving section 62 followed by a quadrature demodulator 64. The received radio signal is converted into separate quadrature baseband signals (I and Q signals) by the combination of the receiving section 62 and the quadrature demodulator 64. The quadrature baseband signals are fed from the quadrature demodulator 64 to an A/D converter 66, being converted into corresponding digital quadrature baseband signals by the A/D converter 66. The digital quadrature baseband signals are fed from the A/D converter 66 to a forward filter (FF) 68 composed of a transversal digital filter.

In the diversity receiver of FIG. 2, a combiner or an adder 72a combines output signals of the forward filters 67 and 68. A subtracter 70a derives the difference between an output signal from the combiner 72a and an output signal from a feedback filter (FBF) 69 composed of a transversal digital filter. A decision section 70 decides demodulated data from an output signal of the subtracter 70a. The demodulated data is used as a receiver output signal. Also, the demodulated data is fed to the feedback filter 69.

In the diversity receiver of FIG. 2, tap coefficients of the forward filters 67 and 68 and the feedback filter 69 can be updated according to a technique used by the prior art receiver of FIG. 1. The diversity receiver of FIG. 2 requires the two quadrature demodulators 63 and 64, the two A/D converters 65 and 66, and the two forward filters 67 and 68.

This invention includes an improvement over the diversity receiver of FIG. 2 in compactness. This invention will now be described in detail.

Figure 3:
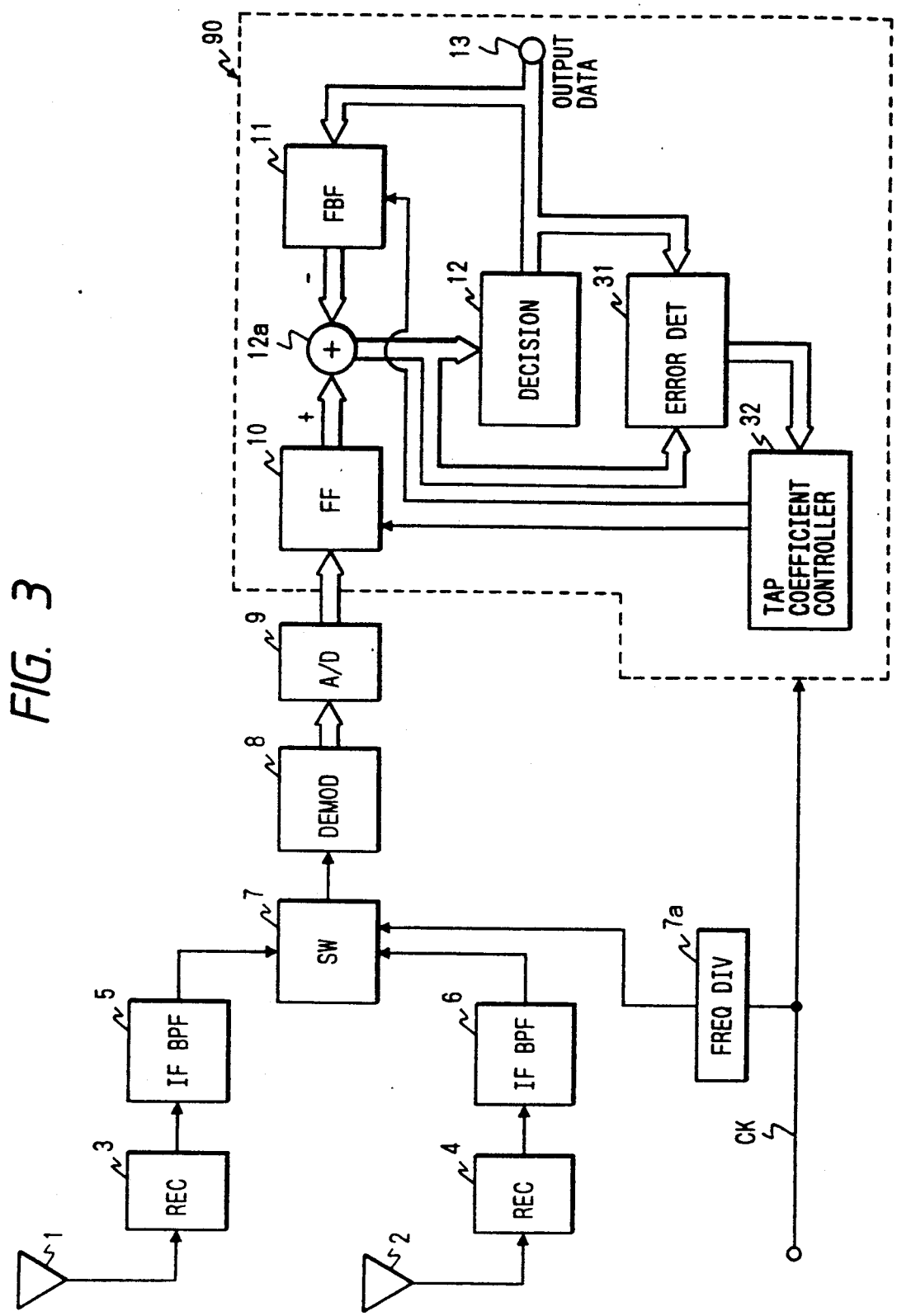
FIG. 3 is a block diagram of a diversity receiver according to an embodiment of this invention.

FIG. 3 shows a diversity receiver according to an embodiment of this invention. It should be noted that this embodiment is designed in order to mitigate for up to a 1-symbol delay of multipath fading. With reference to FIG. 3, a radio signal induced in an antenna 1 is fed to a receiving section 3. The radio signal is amplified and down-converted into an intermediate-frequency (IF) signal by the receiving section 3. The IF signal is fed from the receiving section 3 to an IF band pass filter (BPF) 5, and is processed by the IF band pass filter 5. It is preferable that the IF band pass filter 5 has a narrowest pass band width. An output signal of the IF band pass filter 5 is applied to a switch 7.

On the other hand, a radio signal induced in an antenna 2 is fed to a receiving section 4. The radio signal is amplified and down-converted into an intermediate-frequency (IF) signal by the receiving section 4. The IF signal is fed from the receiving section 4 to an IF band pass filter (BPF) 6, and is processed by the IF band pass filter 6. It is preferable that the IF band pass filter 6 has a narrowest pass band width. An output signal of the IF band pass filter 6 is applied to the switch 7.

The switch 7 periodically and alternately selects one of the output signals of the IF band pass filters 5 and 6 in response to a switch control signal, and outputs the selected signal to a quadrature demodulator 8. The switch control signal is designed so that the period of the change of the signal selection by the switch 7 will be equal to a half of a period Ts corresponding to a symbol rate of digital modulation wave. The output signal of the switch 7 is converted into separate digital quadrature baseband signals (I and Q signals) by the quadrature demodulator 8. The quadrature baseband signals are fed from the quadrature demodulator 8 to an A/D converter 9, being converted into corresponding digital quadrature baseband signals by the A/D converter 9. The digital quadrature baseband signals are fed from the A/D converter 9 to a forward filter (FF) 10 composed of a transversal digital filter.

A subtracter 12a derives the difference between an output signal from the forward filter 10 and an output signal from a feedback filter (FBF) 11 composed of a transversal digital filter. A decision section 12 decides demodulated data from an output signal of the subtracter 12a. The demodulated data is used as a receiver output signal fed to an external device (not shown) via an output terminal 13. Also, the demodulated data is fed to the feedback filter 11.

Tap coefficients of the forward filter 10 and the feedback filter 11 are updated as follows. An error detector 31 derives an error between data represented by the output signal of the subtracter 12a and the demodulated data represented by the output signal of the decision section 12. The error detector 31 informs a tap coefficient controller 32 of the derived error. The controller 32 determines desired tap coefficients on the basis of the error information, and controls actual tap coefficients of the transversal digital filters in the forward filter 10 and the feedback filter 11 in accordance with the desired tap coefficients respectively.

The forward filter 10, the feedback filter 11, the decision section 12, the subtracter 12a, the error detector 31, and the controller 32 compose a decision feedback adaptive equalizer 90.

Figure 4:
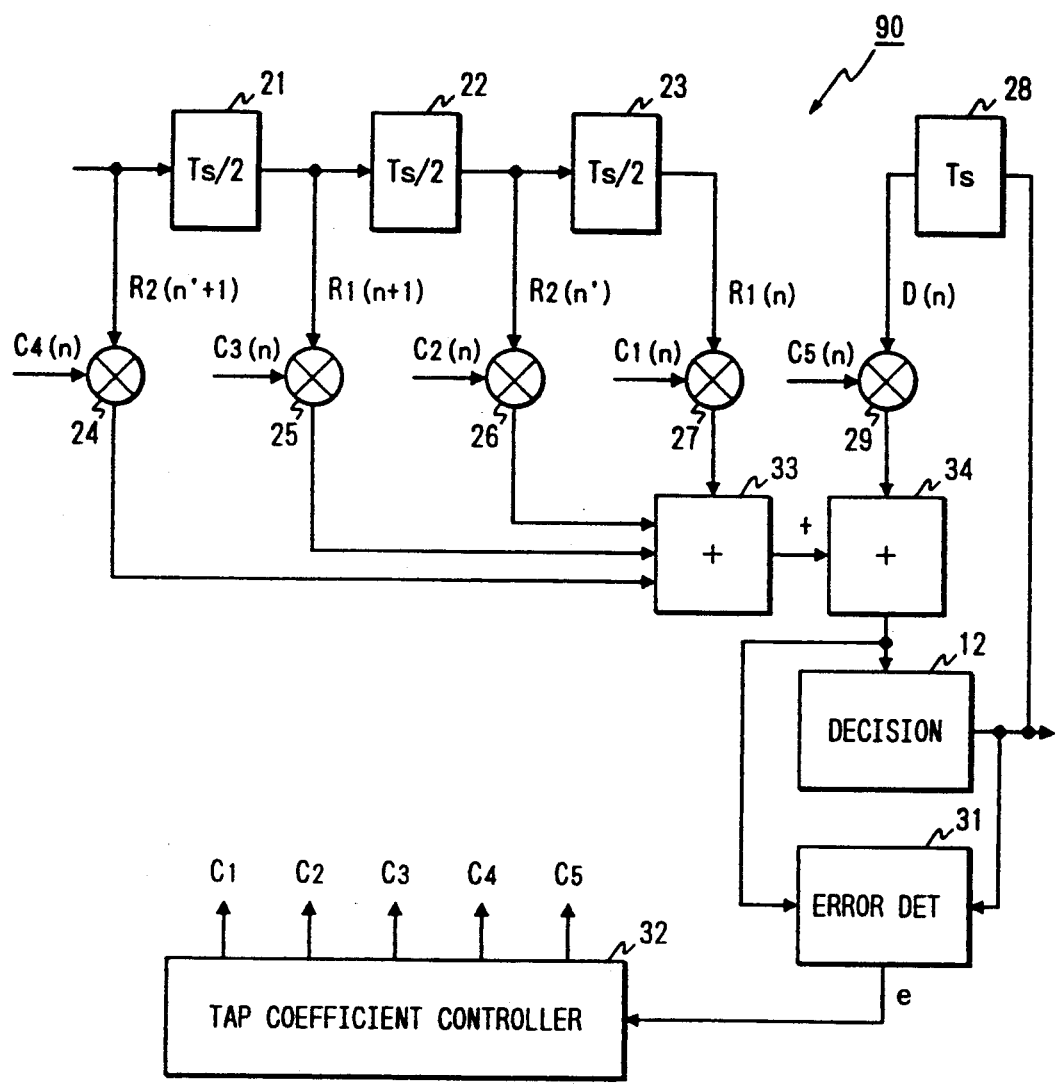
FIG. 4 is a block diagram of a decision feedback adaptive equalizer in the diversity receiver of FIG. 3.

FIG. 4 shows details of the decision feedback adaptive equalizer 90. As shown in FIG. 4, the decision feedback adaptive equalizer 90 includes a series or cascade combination of latches 21, 22, and 23. Each of the latches 21, 22, and 23 provides a signal delay Ts/2 corresponding to a half of the symbol rate period Ts. The first latch 21 receives the output signal of the A/D converter 9.

The decision feedback adaptive equalizer 90 also includes multipliers 24, 25, 26, and 27. The multiplier 24 multiplies the output signal of the A/D converter and an output signal of the tap coefficient controller 32 which represents a calculated tap coefficient C4. An output signal of the multiplier 24 is applied to an adder 33. The multiplier 25 multiplies an output signal of the latch 21 and an output signal of the tap coefficient controller 32 which represents a calculated tap coefficient C3. An output signal of the multiplier 25 is applied to the adder 33. The multiplier 26 multiplies an output signal of the latch 22 and an output signal of the tap coefficient controller 32 which represents a calculated tap coefficient C2. An output signal of the multiplier 26 is applied to the adder 33. The multiplier 27 multiplies an output signal of the latch 23 and an output signal of the tap coefficient controller 32 which represents a calculated tap coefficient C1. An output signal of the multiplier 27 is applied to the adder 33. The adder 33 combines the output signals of the multipliers 24, 25, 26, and 27.

The latches 21, 22, 23, the multipliers 24, 25, 26, and 27, and the adder 33 compose the forward filter 10 of FIG. 3.

The decision feedback adaptive equalizer 90 includes a latch 28, a multiplier 29, and an adder 34. The latch 28 delays the output signal of the decision section 12 by a period equal to the symbol rate period Ts. The multiplier 29 multiplies an output signal of the latch 28 and an output signal of the tap coefficient controller 32 which represents a calculated tap coefficient C5. An output signal of the multiplier 29 is applied to the adder 34. The adder 34 receives an output signal of the adder 33. The adder 34 combines the output signal of the multiplier 29 and the output signal of the adder 33. An output signal of the adder 34 is fed to the decision circuit 12 and the error detector 31.

The latch 28 and the multiplier 29 compose the feedback filter 11 of FIG. 3. The adder 34 corresponds to the subtracter 12a of FIG. 3. It should be noted that the input terminals of the adder 34 are polarized so as to serve as a subtracter, or the sign of the tap coefficient C5 is chosen so as to enable the adder 34 to serve as a subtracter.

The error detector 31 derives an error between the output signal of the adder 34 and the output signal of the decision section 12. The error detector 31 informs the tap coefficient controller 32 of the derived error. The controller 32 calculates the tap coefficients C1, C2, C3, C4, and C5 on the basis of the error information according to a well-known algorithm such as an LMS algorithm or an RLS algorithm. The controller 32 outputs the signals representative of the calculated tap coefficients C1, C2, C3, C4, and C5 to the multipliers 24, 25, 26, 27, and 29. The controller 32 includes a suitable device such as a ROM, a signal processor, or a calculator.

As shown in the part (a) of FIG. 5, the switch control signal fed to the switch 7 has a rectangular waveform, being a binary signal periodically changed between a high level and a low level at a period equal to a half of the symbol rate period Ts. When the switch control signal assumes the low level, the switch 7 selects the output signal of the IF band pass filter 5 in FIG. 3. When the switch control signal assumes the high level, the switch 7 selects the output signal of the IF band pass filter 6. The switch 7 outputs the selected signal to the quadrature demodulator 8. A signal generator (not shown) outputs a basic clock signal CK having a frequency 2N.fs in FIG. 3, where "fs" denotes a frequency 1/Ts corresponding to the symbol rate and "N" denotes a given natural number. A frequency divider 7a subjects the basic clock signal CK to frequency division by a factor of 1/N, thereby deriving the switch control signal having a frequency 2fs and a period Ts/2. The frequency divider 7a outputs the switch control signal to the switch 7.

As shown in the part (b) of FIG. 5, the forward filter 10 periodically samples the output signal of the A/D converter 9 at a period Ts/2. The timing of the sampling of the A/D converter output signal is slightly offset and delayed from the timing of the change (transition) of the switch control signal. The decision feedback adaptive equalizer 90 includes a frequency divider (not shown) which converts the basic clock signal CK into a second clock signal having a period Ts/2. The latches 21, 22, and 23 in the decision feedback adaptive equalizer 90 operates in response to the second clock signal.

As shown in the part (c) of FIG. 5, the tap coefficient controller 32 periodically executes the updating of the tap coefficients C1, C2, C3, C4, and C5 at a period Ts. The timing of the updating of the tap coefficients C1, C2, C3, C4, and C5 is offset ad delayed from the timing of the low-to-high change of the switch control signal by a given interval "to". The decision feedback adaptive equalizer 90 includes a frequency divider (not shown) which converts the basic clock signal CK into a third clock signal having a period Ts. The tap coefficient controller 32 operates in response to the third clock signal. Furthermore, the latch 28 in the decision feedback adaptive equalizer 90 operates in response to the third clock signal.

The operation of the diversity receiver of FIG. 3 will now be further described. The character R1(n) denotes the baseband waveform of the output signal of the IF band pass filter 5 which occurs at a moment $t = nTs + to$ where $n = 1, 2, \ldots$. The character R2(n') denotes the baseband waveform of the output signal of the IF band pass filter 6 which occurs at a moment $t' = nTs + to + Ts/2$. The character D(n) denotes the delayed decided (demodulated) data which occurs at a moment $t = nTs + to$. The baseband waveforms in the respective portions of the decision feedback adaptive equalizer 90 which occur at a moment $t = nTs + to$ determine the output signal E(n) in the decision feedback adaptive equalizer prior to the decision stage. This signal E(n) is given as:

$$E(n) = C4(n) \cdot R2(n'+1) + C3(n) \cdot R(n+1) + C2(n) \cdot R2(-n') + C1(n) \cdot R1(n) + C5(n) \cdot D(n)$$

where C1(n), C2(n), C3(n), C4(n), and C5(n) denote the tap coefficients which occur at a moment $t = nTs + to$. Since the updating of the tap coefficients C1, C2, C3, C4, and C5 is executed every interval Ts, the output signal of the IF band pass filter 5 which is derived from the signal induced at the antenna 1 is always controlled according to the tap coefficients C1 and C3 while the output signal of the IF band pass filter 6 which is derived from the signal induced at the antenna 2 is always controlled according to the tap coefficients C2 and C4. Thus, it is ensured that the equalization-resultant signal E(n) reflects effective combination of the signals induced at the antennas 1 and 2, and there occurs an adequate spatial diversity function even in the presence of delayed wave.

This embodiment is designed so as to be effective in the presence of multipath-fading with a 1-symbol delay or less. In the presence of a 1-symbol delay or more, this embodiment may be modified so that the number of forward taps and feedback taps is increased and alternate feed of the signal to the taps (the filter sections) is executed by the switch 7.

What is claimed is:

1. A diversity receiver for a digital modulation wave having a given symbol rate, comprising:
   a first antenna;
   a first receiving section connected to the first antenna for converting a digital modulation wave induced at the first antenna into a first intermediate-frequency signal;
   a first band pass filter connected to the first receiving section for subjecting the first intermediate-frequency signal to a band pass filtering process;

a second antenna;

a second receiving section connected to the second antenna for converting a digital modulation wave induced at the second antenna into a second intermediate-frequency signal;

a second band pass filter connected to the second receiving section for subjecting the second intermediate-frequency signal to a band pass filtering process;

switch means for alternately selecting one of output signals of the first and second band pass filter at a period equal to a half of a period corresponding to the symbol rate;

a quadrature demodulator connected to the switch means for demodulating an output signal of the switch means into quadrature baseband signals;

an analog-to-digital converter connected to the quadrature demodulator for converting the quadrature baseband signals into corresponding digital signals; and a decision feedback adaptive equalizer connected to the analog-to-digital converter for subjecting the digital signals to an equalizing process.

2. The diversity receiver of claim 1, wherein the decision feedback adaptive equalizer comprises a forward filter including a transversal filter, the transversal filter comprising delay sections for providing signal delays corresponding to a half of the symbol rate period.

3. The diversity receiver of claim 1, wherein the decision feedback adaptive equalizer comprises:

first, second, and third delay circuits connected in series for each providing a signal delay corresponding to a half of the symbol rate period, the first delay circuit being connected to the analog-to-digital converter for receiving the digital signals;

a first multiplier connected to the analog-to-digital converter for multiplying the digital signals and a signal representing a first tap coefficient;

a second multiplier connected to the first delay circuit for multiplying an output signal of the first delay circuit and a signal representing a second tap coefficient;

a third multiplier connected to the second delay circuit for multiplying an output signal of the second delay circuit and a signal representing a third tap coefficient;

a fourth multiplier connected to the third delay circuit for multiplying an output signal of the third delay circuit and a signal representing a fourth tap coefficient;

combining means for combining output signals of the first, second, third, and fourth multipliers to subject the digital signals to the equalizing process; and a tap coefficient controller connected to the first, second, third, and fourth multipliers for calculating the first, second, third, and fourth tap coefficients, and for generating the signals representing the calculated first, second, third, and fourth tap coefficients.

4. The diversity receiver of claim 1, wherein the decision feedback adaptive equalizer comprises:

first, second, and third delay circuits connected in series for each providing a signal delay corresponding to a half of the symbol rate period, the first delay circuit being connected to the analog-to-digital converter for receiving the digital signals;

a first multiplier connected to the analog-to-digital converter for multiplying the digital signals and a signal representing a first tap coefficient;

a second multiplier connected to the first delay circuit for multiplying an output signal of the first delay circuit and a signal representing a second tap coefficient;

a third multiplier connected to the second delay circuit for multiplying an output signal of the second delay circuit and a signal representing a third tap coefficient;

a fourth multiplier connected to the third delay circuit for multiplying an output signal of the third delay circuit and a signal representing a fourth tap coefficient;

first combining means for combining output signals of the first, second, third, and fourth multipliers;

a fourth delay circuit for providing a signal delay corresponding to the symbol rate period;

a fifth multiplier connected to the fourth delay circuit for multiplying an output signal of the fourth delay circuit and a signal representing a fifth tap coefficient;

second combining means connected to the first combining means and the fifth multiplier for combining an output signal of the first combining means and an output signal of the fifth multiplier;

a decision section connected to the second combining means for subjecting an output signal of the second combining means to a decision process, the decision section being connected to the fourth delay circuit for outputting an output signal of the decision section to the fourth delay circuit;

an error detector connected to the second combining means and the decision section for deriving a signal representing an error between the output signal of the second combining means and the output signal of the decision section; and a tap coefficient controller connected to the error detector and the first, second, third, fourth, and fifth multipliers for calculating the first, second, third, fourth, and fifth tap coefficients on the basis of the error, and for generating the signals representing the calculated first, second, third, fourth, and fifth tap coefficients.

* * * * *